(12) United States Patent
Migimatsu

(10) Patent No.: US 8,565,391 B1
(45) Date of Patent: Oct. 22, 2013

(54) VOICE MESSAGE INTERMEDIARY

(76) Inventor: Taka Migimatsu, San Rafeal, CA (US)

(*) Notice: Subject to any disclaimer, the term of this patent is extended or adjusted under 35 U.S.C. 154(b) by 161 days.

(21) Appl. No.: 12/538,808

(22) Filed: Aug. 10, 2009

Related U.S. Application Data

(63) Continuation of application No. 10/047,374, filed on Jan. 14, 2002, which is a continuation of application No. 08/831,790, filed on Apr. 9, 1997, now Pat. No. 6,339,591.

(60) Provisional application No. 60/033,416, filed on Nov. 15, 1996.

(51) Int. Cl.
*H04M 1/64* (2006.01)

(52) U.S. Cl.
USPC .................................. 379/88.22; 379/88.13

(58) Field of Classification Search
USPC ........................................... 379/88; 370/352
See application file for complete search history.

(56) References Cited

U.S. PATENT DOCUMENTS

| | | | |
|---|---|---|---|
| 4,304,968 A | 12/1981 | Klausner | |
| 4,837,798 A * | 6/1989 | Cohen et al. | 379/88.14 |
| 4,964,156 A | 10/1990 | Blair | |
| 5,105,197 A | 4/1992 | Glagett | |
| 5,155,760 A | 10/1992 | Johnson | |
| 5,195,126 A | 3/1993 | Carrier | |
| 5,283,818 A | 2/1994 | Klausner | |
| 5,406,557 A * | 4/1995 | Baudoin | 370/407 |
| 5,475,737 A * | 12/1995 | Garner et al. | 379/88.26 |
| 5,479,411 A * | 12/1995 | Klein | 379/88.13 |
| 5,493,607 A * | 2/1996 | Arumainayagam et al. | 379/88.18 |
| 5,557,659 A | 9/1996 | Hyde-Thomson | |
| 5,572,576 A | 11/1996 | Klausner | |
| 5,608,786 A * | 3/1997 | Gordon | 370/352 |
| 5,631,948 A * | 5/1997 | Bartholomew et al. | 379/88.18 |
| 5,661,782 A * | 8/1997 | Bartholomew et al. | 379/88.18 |
| 5,675,507 A * | 10/1997 | Bobo, II | 709/206 |
| 5,680,442 A * | 10/1997 | Bartholomew et al. | 379/88.26 |
| 5,689,550 A * | 11/1997 | Garson et al. | 379/88.18 |
| 5,712,903 A * | 1/1998 | Bartholomew et al. | 379/88.25 |
| 5,740,231 A * | 4/1998 | Cohn et al. | 379/88.22 |
| 5,768,513 A * | 6/1998 | Kuthyar et al. | 709/204 |
| 5,802,466 A | 9/1998 | Gallant | |
| 5,812,639 A * | 9/1998 | Bartholomew et al. | 370/352 |

(Continued)

FOREIGN PATENT DOCUMENTS

WO WO9728628 A1 8/1997

OTHER PUBLICATIONS

G. Vaudreuil, "Voice Profile for Internet Mail," Request for Comments: 1911, Feb. 1996.

(Continued)

*Primary Examiner* — Joseph T Phan
(74) *Attorney, Agent, or Firm* — Stephen W. Melvin

(57) ABSTRACT

A method and system is provided for receiving a voice message from a first access device, storing said message and subsequently forwarding the voice message to a second access device. The system has a plurality of access devices which are coupled to each other over a network such as the Internet. These access devices may include computers, workstations, and the like. An access device is configured to operate as an intermediary access computer in which it receives a voice message from one access device over the network and subsequently re-transmits it over the network to another access device.

13 Claims, 12 Drawing Sheets

(56) References Cited

U.S. PATENT DOCUMENTS

| | | | |
|---|---|---|---|
| 5,867,495 A | 2/1999 | Elliot | |
| 5,905,476 A | 5/1999 | McLaughlin | |
| 5,946,386 A | 8/1999 | Rogers | |
| 6,011,794 A | 1/2000 | Mordowitz | |
| 6,069,890 A * | 5/2000 | White et al. | 370/352 |
| 6,215,858 B1 * | 4/2001 | Bartholomew et al. | 379/88.17 |
| 6,233,318 B1 * | 5/2001 | Picard et al. | 379/88.17 |
| 6,243,374 B1 * | 6/2001 | White et al. | 370/352 |
| 6,285,745 B1 * | 9/2001 | Bartholomew et al. | 379/88.17 |
| 6,549,612 B2 | 4/2003 | Gifford | |
| 6,570,871 B1 | 5/2003 | Schneider | |
| 6,633,630 B1 | 10/2003 | Owens | |
| 7,020,688 B2 | 3/2006 | Sykes | |
| 7,212,617 B2 | 5/2007 | Owens | |
| 7,552,180 B2 | 6/2009 | Sugawara | |

OTHER PUBLICATIONS

C. Yang, "INETPhone: Telephone Services and Servers on Internet," Request for Comments: 1789, Apr. 1995.

Appeal Brief, Examiner's Answer and Reply Brief for U.S. Appl. No. 10/047,374, Feb. 10, 2010-May 12, 2010.

* cited by examiner

VOICE MESSAGE INTERMEDIARY

RELATED APPLICATIONS

This application is a continuation of U.S. patent application Ser. No. 10/047,374, filed on Jan. 14, 2002, which is a continuation of U.S. patent application Ser. No. 08/831,790 filed on Apr. 9, 1997, now U.S. Pat. No. 6,339,591, issued on Jan. 15, 2002, which claims priority to U.S. Provisional Patent Application No. 60/033,416 filed on Nov. 15, 1996. All of these priority documents are incorporated herein by reference in it entirety.

BACKGROUND

The present invention relates generally to communication techniques. The techniques include a system and method of communicating telephone messages, such as voice, paging, and facsimile (fax) messages, by way of the Internet or any other network system having some form of transmission control protocol and not necessarily the TCP/IP protocols. More specifically, the invention relates to communicating such messages from and to stations which need not themselves require a computer or, in the case of voice transmission, any other form of central processing unit or digital signal processor.

Conventional telephone and facsimile communication involves real time communication and is often directly between calling and receiving parties. These conventional techniques generally require a telephone and/or a facsimile machine. As numerous countries industrialize, telephones and facsimile machines are becoming more available worldwide. As the number of users increases, the amount of traffic generated by telephones and/or facsimile machines also increases proportionately. Telephone calls between users in different countries such as Japan and the United States, however, continue to be quite expensive. For instance, a typical week-long business trip in Japan from the United States can incur hundreds of U.S. dollars worth of telephone services. Increased traffic generated by telephones and/or facsimile machines also leads to "jams" in the communication lines, thereby leading to calls that never reach the receiving party.

In attempts to resolve some of these limitations, communication techniques have been proposed to use the Internet as a real time communication means. These communication techniques generally require at least two computers, where one computer is at the caller site and the other computer is at the receiver site. These computers, however, require a modem, which is connected to the Internet using a TCP/IP transmission protocol. A limitation with these techniques is that computers connected to the Internet are not generally available at easy to use locations. In addition, the servers on the Internet often malfunction, which lead to less than real time communication between calling and receiving parties.

From the above, it can be seen that a technique for communication that is easy-to-use and cost effective is highly desirable.

SUMMARY OF THE INVENTION

According to the present invention, a technique for providing voice messages and paging functions using a system of "networked" computers is provided. This technique, including a method and system, uses existing telephones and pagers which are coupled to the Internet system for transmitting and receiving voice messages to a receiver from a caller.

In a specific embodiment, the present invention provides a system for transmitting messages from a caller location to a receiver location using a plurality of computers each coupled to another such as the Internet. The system also has a plurality of access devices, which are coupled to the network through a telecommunication line. These access devices include computers, workstations, and the like. Each access device includes a voice conversion board for converting a voice message from a telephone device into digital data for transmission through the network.

In an alternative embodiment, a method for telecommunication is provided. The method includes transmitting information from a first telephone device at a receiver location in a first service area through a telecommunication medium (i.e., telephone line, etc.), and receiving at the first service area the information in a first access device. The method also includes converting the information into a digital signal, and transmitting the digital signal over the Internet to a second access device at a second service area. Further steps of converting the digital signal into data for storage into a memory, and retrieving the data from the memory at the second service area using a second telephone device are provided.

A system for transmitting messages from a caller location to a receiver location using a paging system is also provided according to the present invention. The system has a plurality of computers, each of the computers being coupled to each other through a network such as the Internet. The system also has a plurality of access devices which are each coupled to the network through a telecommunication line. A paging device is also provided. This paging device is coupled to the access device using a paging system, which is adapted to receive paging data from a caller which will be sent to a receiver. The access device includes a processor coupled to a memory. The processor is also coupled to a voice conversion board for converting a voice message from a telephone device into digital data for transmission through the network. The processor also oversees receiving first paging data from the caller and transmitting paging data to the receiver through the telecommunication line.

In yet an alternative embodiment, a method of telecommunication using a paging system is provided. The method includes receiving at an access computer voice message data and paging data from a telecommunication line coupled to the Internet, where the paging data includes a paging number and a caller code. The method also includes converting the paging data and the caller code into telephone key codes at the access computer and calling a paging unit at a receiver location using a paging system, and transmitting the caller code to the paging unit at the receiving location, which calls the receiver using a local number.

Benefits of the invention include an easy-to-use voice mail and paging system. In particular, a caller of the present invention can rely upon almost any telephone to leave a voice mail for a receiver at a non-local mailbox using a local call or the like, which reduces costs associated with any conventional long distance telephone calls. Additionally, a caller can also page and leave a voice mail for a receiver at a non-local mailbox using a local call, further reducing costs associated with conventional long distance telephone calls. The page attracts the attention of the receiver, who can then call at that time, or some other time. Since these calls are generally all local in nature, the caller does not incur the costs associated with long distance calls. These long distance calls can be quite substantial when calling from countries outside the United States such as Japan, Korea, Europe, and others to the United States, for example.

The present invention achieves these benefits and others in the context of known telephone and computer technology. A further understanding of the nature and advantages of the present invention, however, may be realized by reference to the latter portions of the specification and attached drawings.

DETAILED DESCRIPTION

Figure 1:
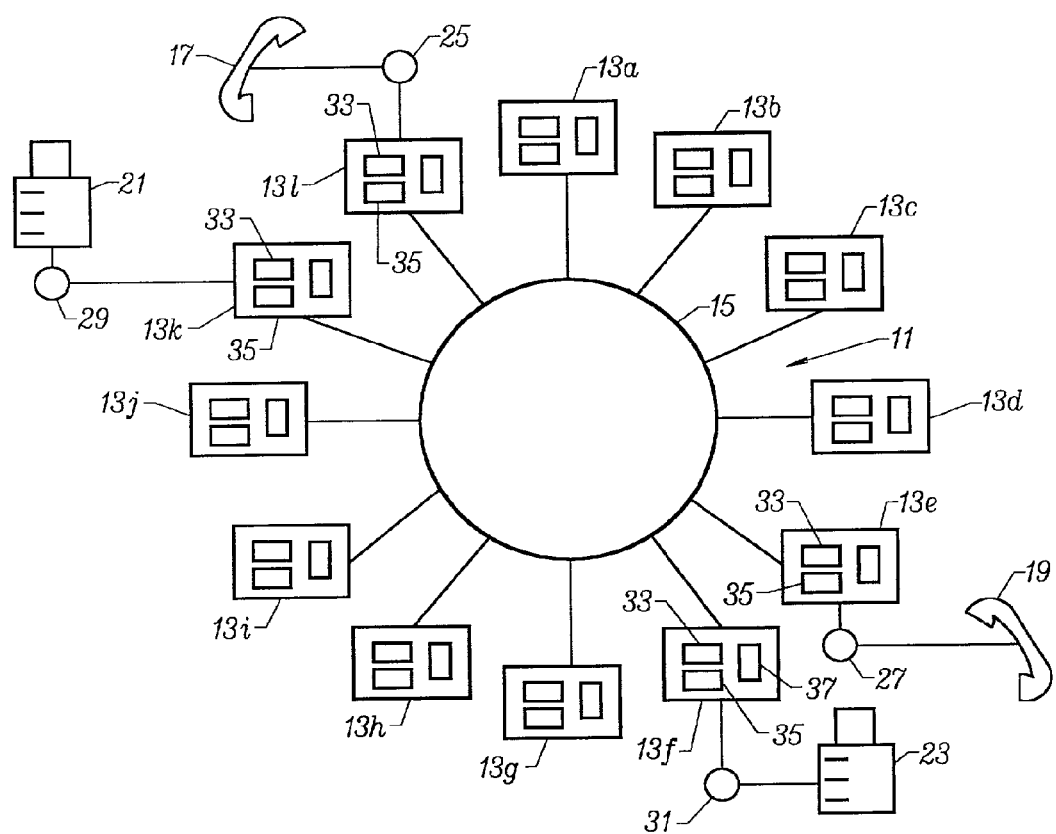
FIG. 1 is a simplified block diagram of access computers coupled to a network of computers according to an embodiment of the present invention.

FIG. 1 is a simplified representation of a network of computers, e.g., Internet, etc.

The simplified representation of computers is merely an illustration and should not limit the scope of the claims defined herein. The network of computers 11 can be the Internet 11. The Internet includes representative computers 13a through 13l interconnected with each other, as well as with many other computers (not shown), by means of the usual telephone lines and/or gateways 15. Each of the computers 13a through 13l serve as an access point in the system of the invention. The computers are merely illustrative, there can be hundreds, thousands, or even millions of these access point computers or access devices. The computers can be any suitable computer or workstation capable of coupling to the Internet. Examples of these computers include personal computers, computers sold under the tradename of Apple™, workstations, network computers, and others. These computers can also run a variety of operating systems and have various browsers or the like. Additional features of the computer will be discussed by way of the description below.

In addition to the access point computers 13a through 13l, there are shown representative telephone sets 17 and 19 and fax machines 21 and 23. The telephone 17 may be selectively coupled through its own central office 25, and possibly others, to various telephone units throughout the world. Similarly, the telephone 19 and faxes 21 and 23 may be selectively coupled through their respective central stations 27, 29 and 31 to other telephone units. The telephone units can be any device capable of transmission of voice signals into the telephone lines of telephone companies. These telephones include conventional analog phones, digital phones, computer phones, cellular phones, and the like. As for the facsimile machines, they can be almost any suitable machine capable of transmitting facsimile data via telephone lines. The telephones and facsimile machines are merely illustrative, literally hundreds, thousands, millions, and even billions of these units may be coupled to the access point computers.

So that all of the access computers 13a through 13l are capable of communicating on the Internet, they should each usually include a modem. So that computers 13l, 13k, 13e, 13f, for example, can communicate with telephones 17, 19, and fax 21, 23, they should each include a voice/fax board 33. The voice/fax board can be a single unit or multiple units, depending upon the application. An example of a preferred voice/fax board is one sold by a company called Rhetorix, Model RDSP. Of course, other boards can be used depending upon the application.

In addition, each of the access point computers 13a through 13l includes two types of control, one for telephone/fax communication and one for Internet communication. Such controls are known in the art and are software controllable, but can be hardware controllable too. Furthermore, each of the access computers 13a through 13l should be capable of performing the functions of a host computer; that is, it should be capable of transmitting and receiving data from and to other access computers by using a communication protocol. In order for the system to operate automatically, at least one access computer must be a server in the sense that it has a dedicated Internet connection. If non-automatic operation is acceptable, no server at all is necessary so long as both the sending and receiving access computers and their modems are up and running at the time of transmission.

Figure 2:
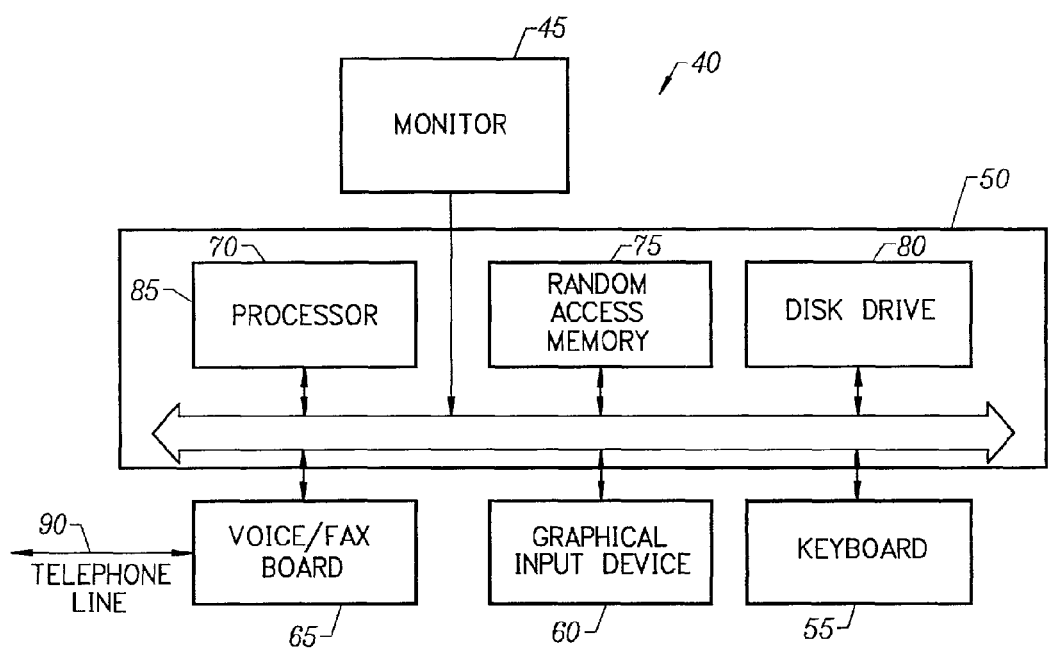
FIG. 2 is a block diagram of a system 40 according to a preferred embodiment of the present invention.

FIG. 2 is a block diagram of a system 40 according to a preferred embodiment of the present invention. System 40 includes a monitor 45, a computer 50, a keyboard 55, a graphical input device 60, and a voice/fax board 65. Computer 50 includes familiar computer components such as a processor 70, and memory storage devices, such as a random access memory (RAM) 75, a disk drive 80, and a system bus 85 interconnecting the above components. A telephone line 90 is coupled to voice/fax board 65.

A mouse is but one example of a graphical input device, also known as a pointing device, a trackball is another. RAM 75 and disk drive 80 are examples of tangible media for storage of computer programs such as embodiments of the herein described methods. Other types of tangible media include floppy disks, removable hard disks, optical storage media such as CD-ROMS and bar codes, and semiconductor memories such as flash memories, read-only-memories (ROMS), and battery-backed volatile memories.

In a preferred embodiment, System 40 includes a IBM PC compatible computer having a '586-class based microprocessor, such a Pentium™ from Intel Corporation, running WindowsNT™ from Microsoft Corporation, and CalleX™ software from Tokis Inc. Voice/fax board 65 is preferably a RDSP board from Rhetorix. Inc.

FIG. 2 is a representative of one type of system embodying the present invention. It will be readily apparent to one of ordinary skill in the art that many system types, hardware and software configurations are suitable for use with the presently described embodiments.

Figure 3:
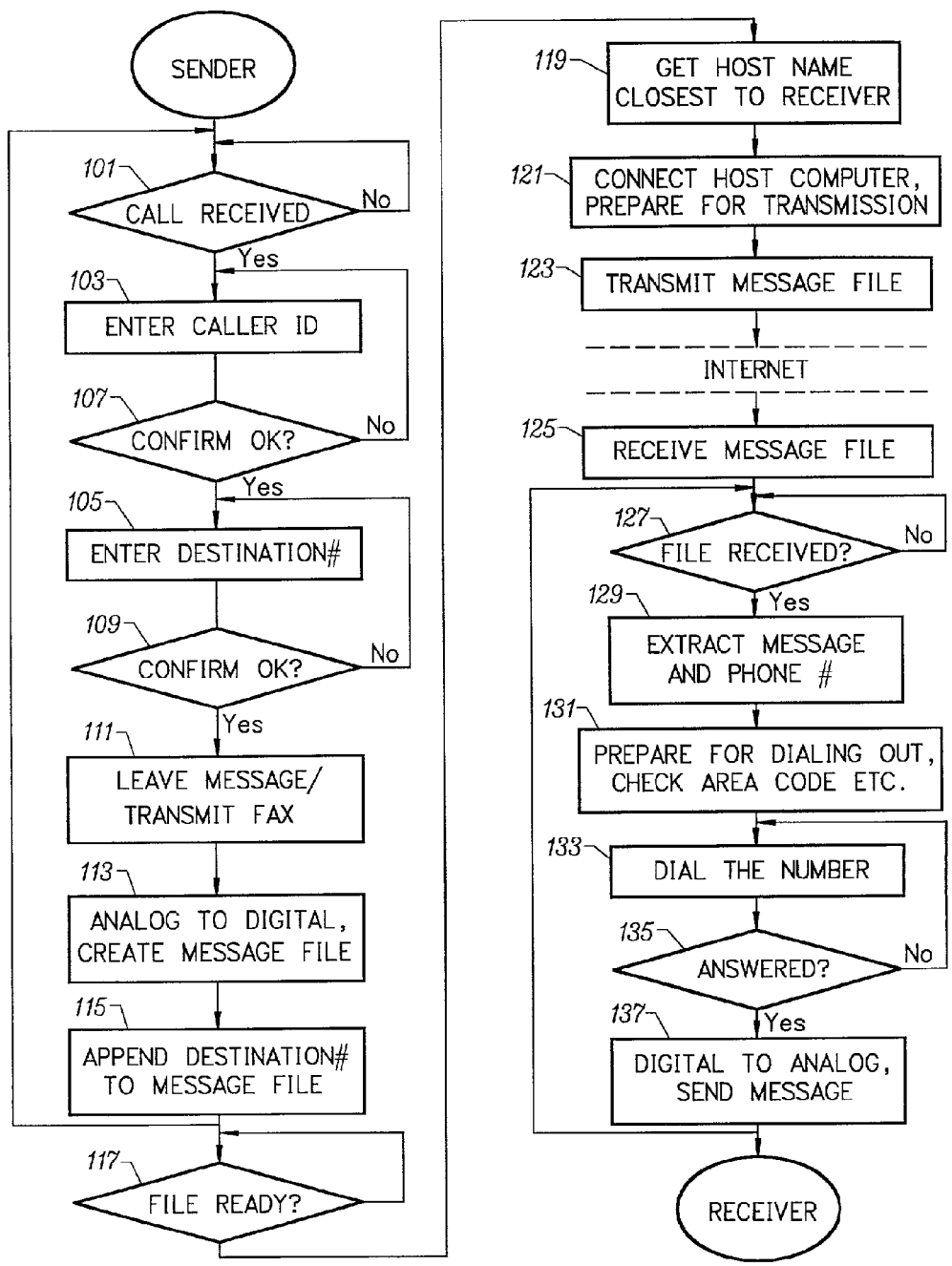
FIG. 3 is a simplified flow chart of a process according to an embodiment of the present invention.

Referring to FIGS. 1 and 3 together, the operation of a system in accordance with the invention may be better understood. This operation is merely an example and should not limit the scope of the claims. One of ordinary skill in the art would recognize other modifications, variations, and alternatives.

In an embodiment, when a user of telephone 17, located for instance in the United States in the "415" telephone area code and the "472" service area, desires to send a voice mail message to someone in London, England having the telephone number 44-181-456-1234, he need merely telephone an access computer 13*l* in his own local telephone area.

The access computer 13*l* is configured to periodically operate in its telephone/fax control mode and, in that mode, to poll the incoming telephone lines to determine whether a call is being received as shown in FIG. 3 at step 101. When the incoming call from telephone 17 is recognized, the program configuration of the computer 13*l* causes to be generated a recognizable tone signal or a prerecorded or digital voice statement asking the caller to identify himself, step 103, and to provide the destination telephone number, including all necessary country and area codes, step 105.

In response to these inquiries, the caller need merely key the requested identification and destination information through his telephone handset. Upon confirmation of valid responses to these inquiries, steps 107 and 109, another recognizable tone signal or prerecorded or digital voice statement may be generated asking the caller to then speak the voice message or to start the fax to be forwarded to the destination number, step 111. The caller then merely speaks his message.

The caller's message is received by the access computer 13*l* through its voice/fax board 33 where it is converted from analog to digital format, creating a message file, step 113. The destination telephone number is appended to the message file, step 115. In the event that no country or area code was keyed in, indicating a "local" message, the access computer will add default country and/or area codes for its own location. The message file is then stored in an outgoing repository memory 35 in the access computer 13*l* and the file is considered "ready".

In the Internet mode of operation, the access computer 13*l* is programmed to periodically poll the outgoing repository memory 35 to determine whether a message to be communicated has been stored, step 117. Upon recognizing that the message from telephone 17 has been stored in the repository memory, the access computer 13*l* will compare the destination telephone number, 44-181-456-1234, with a host computer name look-up table and determine the Internet address of the access computer nearest to that of the destination telephone number, step 119. A drastically abridged version of such a table is shown in the table below:

1 Country Area Service Name of Nearest Code Code Area Code Host Computer 01 408 526 sanjose.newnet.com 01 408 791 southbay.newnet.com 01 415 472 northbay.calnet.com 01 415 591 sfpeninsula.newnet.com 01 415 781 sanfran.calnet.com 01 510 323 eastbay.calnet.com 01 703 305 northvirginia.vanet.com 01 052 124 parma.co.it 44 173 928 uknet.co.uk 44 181 456 londonnet.co.uk 61 3 817 melbourn.co.au 81 03 3475 tokyonet.co.jp 886 035 732 taipei.co.tw In the example being considered, the look-up table indicates that the Internet address of the nearest access computer is "londonnet.co.uk", which for the purposes of this example may be considered the access computer 13*e*. The access computer 13*l* then preferably via Internet (step 121), transfers the message file to that computer, step 123, where it is stored in an incoming repository memory 37. This is typically performed by sending an e-mail message to the appropriate internet address. The e-mail typically includes the voice message as an embedded attachment.

Access computer 13*e*, operating in its Internet mode, receives the e-mail message, step 125. In its telephone/fax mode, computer 13*e* is programmed to periodically poll its memory to determine if an incoming message file has been received, step 127. Once it has determined that such a message has been received, it detaches the destination telephone number from the file, step 129; prepares the number for dialing by eliminating all unnecessary country and area codes which are no longer necessary, step 131 and dials the number of the desired telephone 19, step 133. The access computer determines if the telephone 19 is answered, step 135 and, if so, converts the message to analog format and sends it, step 137. If the telephone 19 is answered by a message recorder, the message is sent as voice mail.

When a fax message, rather than a voice message, is to be sent, the operation is only slightly different. When a user of a fax machine 21, located for instance in the United States in the "415" telephone area code and the "591" service area, desires to send a fax to a machine in Northern Virginia having a telephone number (703) 305-6789, he may proceed in a manner similar to that for a voice message. He may, by way of his fax telephone line, telephone an access computer 13*k* in his local telephone area and respond to the identification and destination address inquiries as set forth above with respect to voice mail messages. However, in response to the signal or statement asking the caller to speak the message or start the fax, the caller need merely to start his fax machine 21.

As with the voice message, the fax message is received by the computer 13*k* through its voice/fax board 33 and is converted to a digital format, creating an outgoing message file, step 113, including the destination fax phone number. The remainder of the fax transmission is identical to voice transmission, it being understood that when the fax is finally sent to the receiving fax machine 23, the access computer 13*f* is configured to determine that the answer inquiry in step 135 requires recognition of a fax machine.

Figure 4:
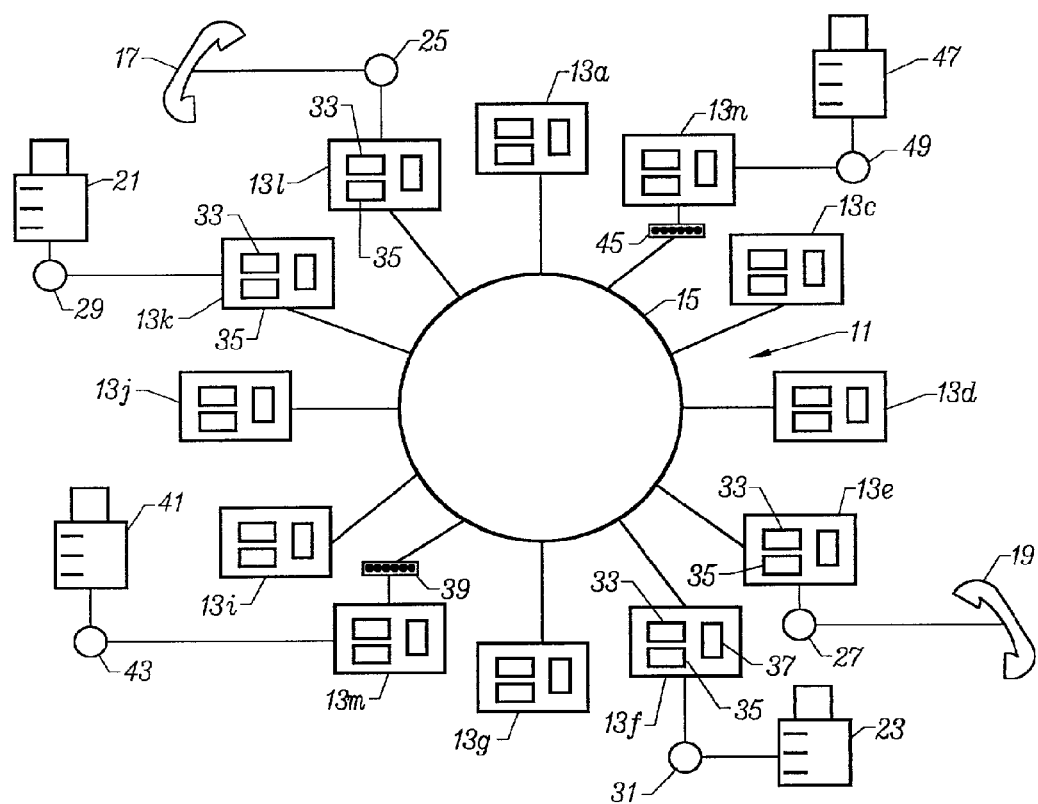
FIG. 4 is a simplified block diagram of an alternative embodiment of access computers coupled to a network of computers according to an embodiment of the present invention.

In an alternative embodiment of the invention as shown in FIG. 4, a computer connected to the network only by a modem can be used as the sending and/or receiving access computer. The access computer 13*m* is not a server in that it does not have a dedicated Internet connection line. Rather, it is connected to the Internet 11 by means of a modem 39. With such an arrangement, a user of the fax machine 41 uses the same procedures as set forth above with respect to the embodiment of FIG. 1. If the fax is to be sent to a fax machine available to a receiving access computer which is a server, such as the access computer 13*f*, the overall operation will also be as described above in connection with FIGS. 1 and 3.

However, if the fax is to be sent to a fax machine 47 economically available only through a non-server receiving access computer, such as access computer 13*n*, a somewhat different procedure is required if the computer 13*n* is not connected to the Internet through its modem 45 when the fax is being sent. This different procedure requires the availability of an intermediary access computer which is a server.

Figure 5:
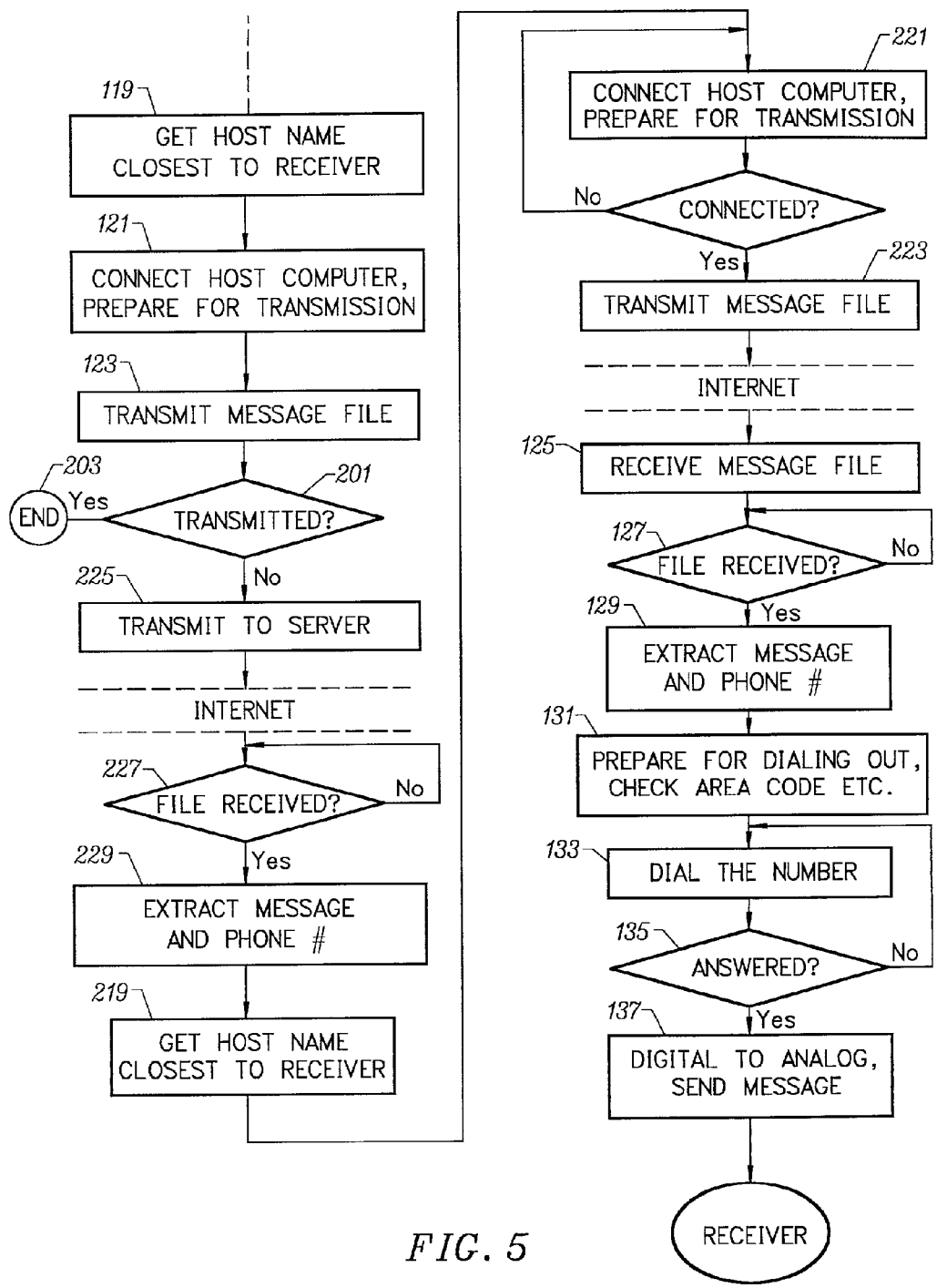
FIG. 5 is a simplified flow chart of a further process according to still another embodiment of the present invention.

Referring to FIGS. 3 and 5 together, the operation of a system in accordance with this embodiment of the invention may be understood. In FIG. 4, any of the access computers having a dedicated access to the telephone lines and gateways 15 of the Internet 11, such as the computer 13*g*, may serve as the intermediary access computer. When a user of fax machine 41 desires to send a fax to the fax machine 47, he proceeds as in the embodiment of FIG. 1 but placing his original telephone call to access computer 13*m*. The operation of the computer 13*m* is identical to steps 101 through 123 of FIG. 3 (only steps 119 through 123 are shown in FIG. 5). As shown in FIG. 5, the computer 13*m* is configured to query whether the transmission is completed, step 201.

If the host computer 13*n* is up and running, the computer 13*m* can transmit the message as in the previous embodiment and an affirmative response to the "Transmitted?" query 201 causes the computer 13*m* to end its operation on the fax, step 203. However, if the receiving access computer 13n is not up and running, the transmission will not be completed but will be transmitted to a server such as the access computer 13g, step 225 acting as an intermediary access computer.

The access computer 13g, operating in its Internet mode of operation, senses the incoming file, step 227 and extracts the fax message and destination fax phone number, step 229. The access computer 13g, acting as an intermediary, is further configured to then operate much as sender access computer in that it determines the host computer name nearest to that of the destination fax telephone number, step 219 and attempts to connect and transmit to the receiving access computer 13n, step 221. If the connection and transmission are not successful, the access computer 13g repeats the attempt. If the log on is successful, the message is transmitted, step 223. Once the message is successfully received by the access computer 13n, the remainder of the operation is identical to that described with respect to FIGS. 1 and 3.

In an even broader scope, a single access computer having a dedicated access to the telephone lines and gateways 15 of the Internet could service the entire system. Moreover, a computer dedicated to the intermediary function and with no telephone/fax mode of operation could be employed to serve as the repository memory for the entire system.

Figure 6:
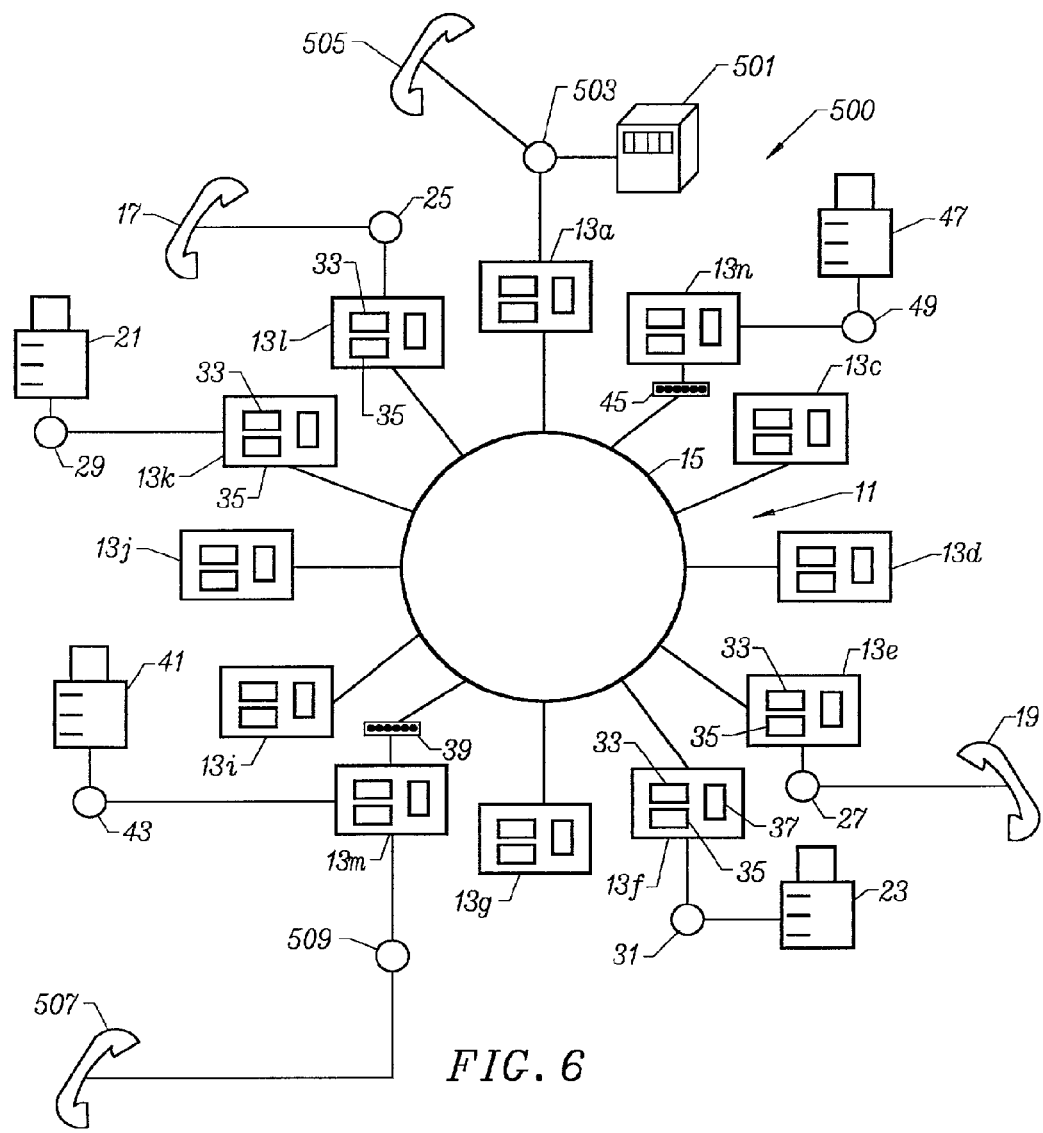
FIG. 6 is a simplified block diagram of access computers coupled to a network of computers and a paging system according to the present invention.

A further embodiment provides a paging system 500 coupled to any of the above systems, as illustrated by FIG. 6. This paging system is generally used by a caller to page a receiver using the present invention. This allows the caller to page a receiver to retrieve voice messages, fax messages, and the like that should be brought to the attention of the receiver in an efficient manner. Other benefits of the paging system will be better understood by way of the following descriptions.

As previously described, the system includes computers 11 on the Internet 11. The Internet includes representative computers 13a through 13l interconnected with each other, as well as with many other computers not shown, by means of the usual telephone lines and gateways 15. Each of the computers 13a through 13l serve as an access point in the system of the invention.

In addition to the access point computers 13a through 13l, there are shown representative telephone sets 17 and 19 and fax machines 21 and 23. The telephone 17 may be selectively coupled through its own central office 25, and possibly others, to various telephone units throughout the world. Similarly, the telephone 19 and faxes 21 and 23 may be selectively coupled through their respective central stations 27, 29 and 31 to other telephone units.

So that all of the access computers 13a through 13l are capable of communicating not only on the telephone/fax line but also on the Internet line, they should each usually include a modem. So that computers 13l, 13k, 13e, 13f, for example, can communicate with telephones 17, 19, and fax 21, 23, they should each include a voice/fax board 33. The voice/fax board can be a single unit or multiple units, depending upon the application.

Each of the access point computers 13a through 13l also includes two types of control, one for telephone/fax communication and one for Internet communication. Such controls are often software controllable, but can be hardware controllable too. Furthermore, each of the access computers 13a through 13l should be capable of performing the functions of a host computer; that is, it should be capable of transmitting and receiving data from and to other access computers by using a communication protocol. In order for the system to operate efficiently, at least one access computer must be a server in the sense that it has a dedicated Internet connection.

Alternatively, no server is necessary so long as both the sending and receiving access computers and their modems are up and running at the time of transmission.

These access point computers 13a through 13l are each also coupled to a paging system. The paging system can be any suitable system capable of being coupled to any of the above access computers in any of the above service areas. As an example, the paging system includes both local and wide area paging networks 503.

Local area networks generally provide paging services using one or more transmitters operating on a single or multiple frequencies, which cover all or a portion of a metropolitan area. Wide area networks encompass several overlapping areas of a large metropolitan area or a number of non-overlapping metropolitan areas. Paging occurs by using a variety of local transmitters, and broadcasting the paging message from all transmitters to an intended receiver who may be anywhere within the wide area network. Preferably, the paging system includes features of both local and wide area networks or the like. This paging system allows a receiver to receive pages or messages within the service area or outside the service area in an efficient manner.

The paging system 500 includes a plurality of paging units 501 or the like. Each of these paging units 501 is attached to or held by the receiver. An example of a paging unit is from Pacific Bell, which is a product manufactured by Motorola. Of course, other paging units can be used depending upon the application.

Figure 7:
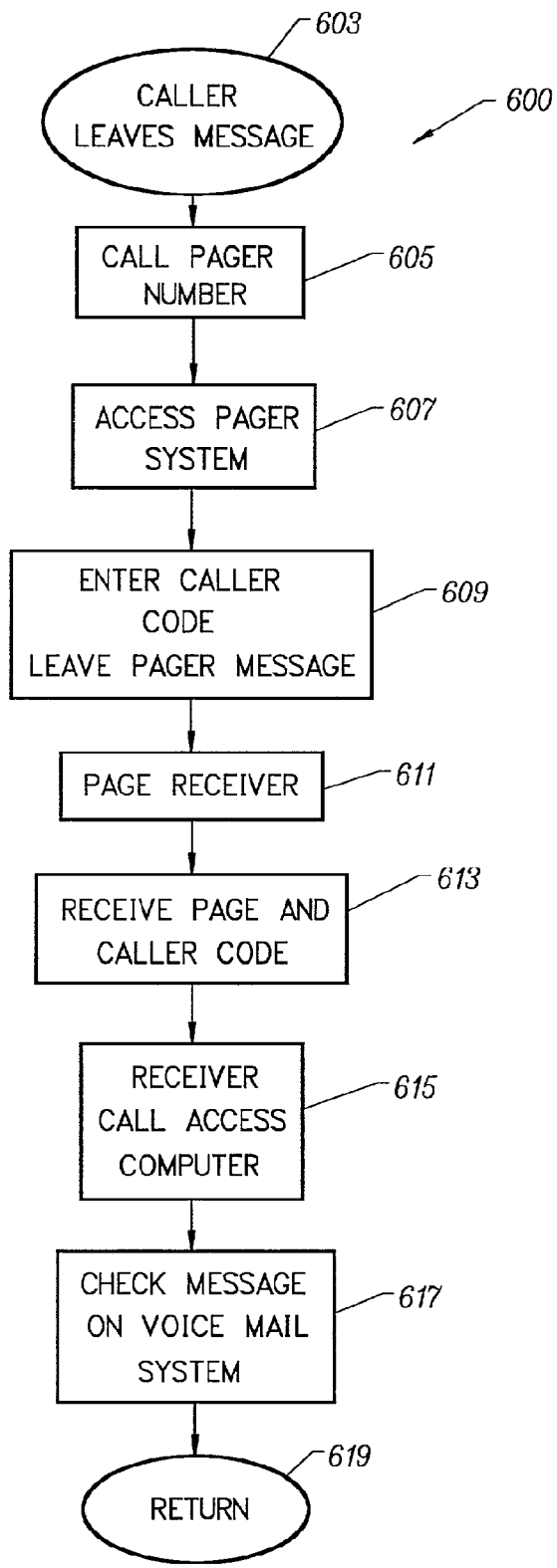
FIG. 7 is a simplified flow chart of a process using the paging system with the access computers according to the present invention.
Figure 8:
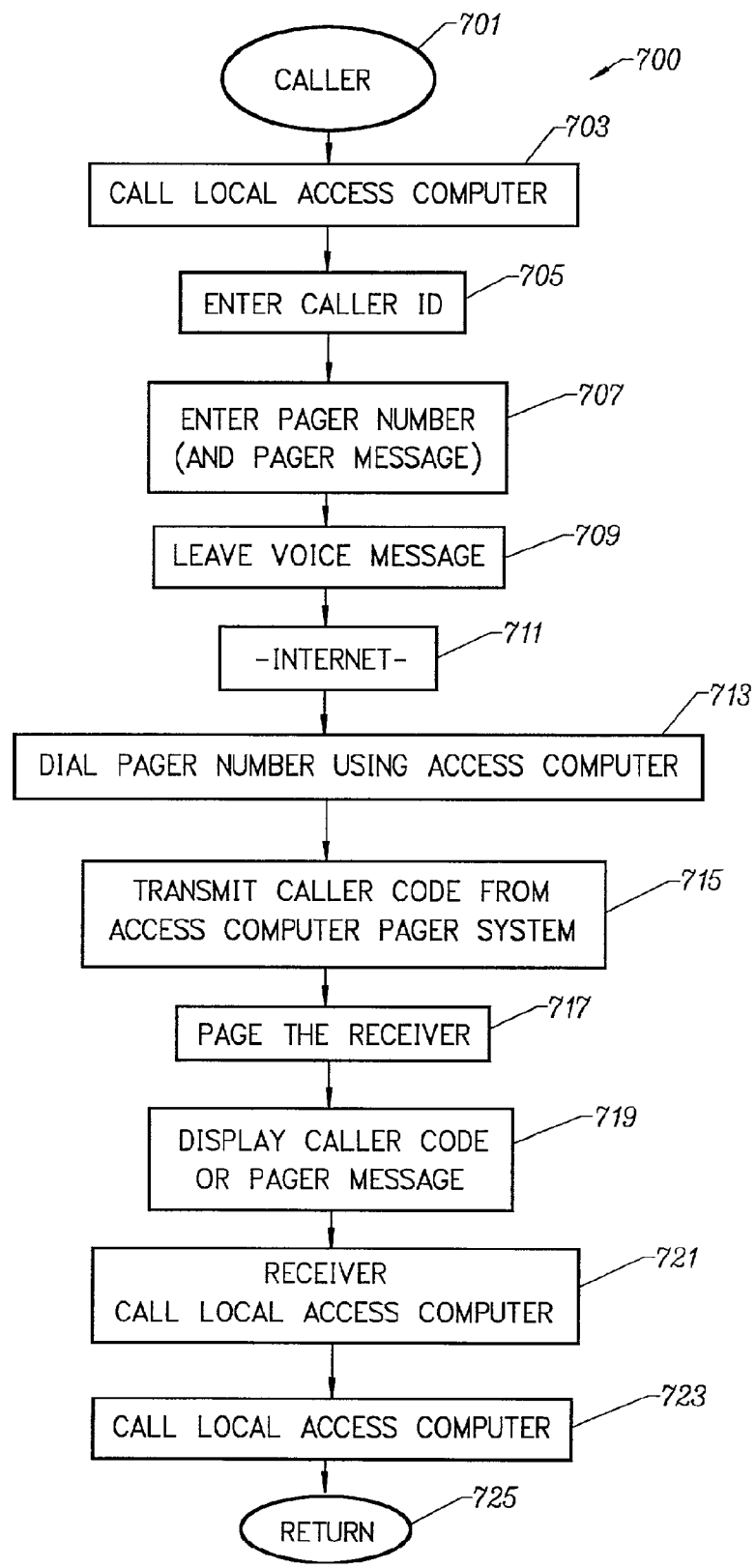
FIG. 8 is a simplified flow chart of an alternative process using the paging system with the access computers according to the present invention.

Referring to FIGS. 6, 7, and 8, aspects of operating the paging system according to the present invention are described. Of course, these operating aspects are merely examples and should not limit the scope of the claims herein. One of ordinary skill in the art would recognize other variations, modifications, and alternatives.

In an embodiment, the system uses a calling procedure for paging a receiver as illustrated by the simplified flow diagram 600 of FIG. 7. The caller (step 603) first places a voice message from a receiver into the system by way of any of the embodiments described herein. For instance, the caller makes a local call to a local access computer and provides a voice message or facsimile message for the receiver. Any of the above techniques among others can be used.

Rather than allowing the receiver to select the time for accessing the voice message without any notification from the caller, the caller pages the receiver by way of this embodiment to notify the receiver of the voice or facsimile message. For instance, the caller picks up a conventional telephone 505 and dials a phone number 605 which access a paging system 607. The phone number corresponds to the paging unit held by the receiver.

After accessing the paging system, the caller enters a code 607 using the telephone keypad in the form of a numeric or alphanumeric message to complete the paging process from the caller side. The receiver receives the page (step 611) and the code from the caller (step 613). Based upon the code from the caller, the receiver is now notified that a voice message or facsimile message waits in the receiver's voice mail or facsimile machine. The receiver calls using a conventional phone the voice mail or facsimile machine to check for the caller's message (step 617). The operation then returns (step 619) to step 603.

An alternative embodiment 700 allows the caller to place the voice message and the page into the access computer during a single phone connection, as illustrated by FIG. 8. The caller (step 701) calls (step 703) via telephone 507 to a local access computer 13m, for example, without paying for long distance services by the telephone company or the like.

The caller waits for the proper prompt on the telephone from the access computer and then accesses the access computer by entering his/her identification number 705. Upon receiving the proper prompt from the access computer, the caller enters a pager phone number 707 for the receiver. A further prompt from the access computer indicates that a voice mail message is ready to be transmitted by the caller. The caller provides the voice mail message into the access computer by speaking into the telephone. Details of providing and converting the voice mail message were described in the preceding embodiments. The voice mail message and pager phone number are converted into a digital format for transmission over the Internet 711 to the receiver's voice mail destination.

At this destination at another access computer, the pager number for the receiver is dialed (step 713) using the access computer. The access computer connects to the paging system. Once connected, the caller code is transmitted to the paging system (step 715) from the access computer. The receiver is paged (step 717) by the paging system. The receiver receives the page and the code from the caller on a display (step 719) on the paging unit, thereby notifying the receiver of the caller's voice mail message or facsimile message. The caller calls (step 721) via telephone to a access computer having the voice message by the receiver. The receiver retrieves the voice message (step 725) deposited by the caller. Details of this operation were described above and are further described below.

These descriptions for sending voice messages and paging are merely examples of the types of functions that can be performed on the present system for telecommunications. Various modifications, alternatives, and variations can also be used. Accordingly, the above descriptions should not limit the scope of the claims herein.

System Software

An embodiment any of the above systems can be implemented on a computer or computers using processing functions which are carried out using computer software. This software is programmed into a memory of one of the computers or more than one computer or other portions of the system. The software can be programmed using a suitable code such as C, C++, and others.

The software is merely an example of a medium used for implementing embodiments of the present invention. The software can be combined or separated using software features and hardware. Additionally, features in the software can also be implemented using objects or the like. Of course, one of ordinary skill in the art would recognize other modifications, alternatives, and variations. Details of the software are described by way of the Figures below.

FIGS. 9-12 are simplified illustrations of methods or processes implemented using computer software and system hardware. Of course, other processes or methods can be used depending upon the application.

Figure 9:
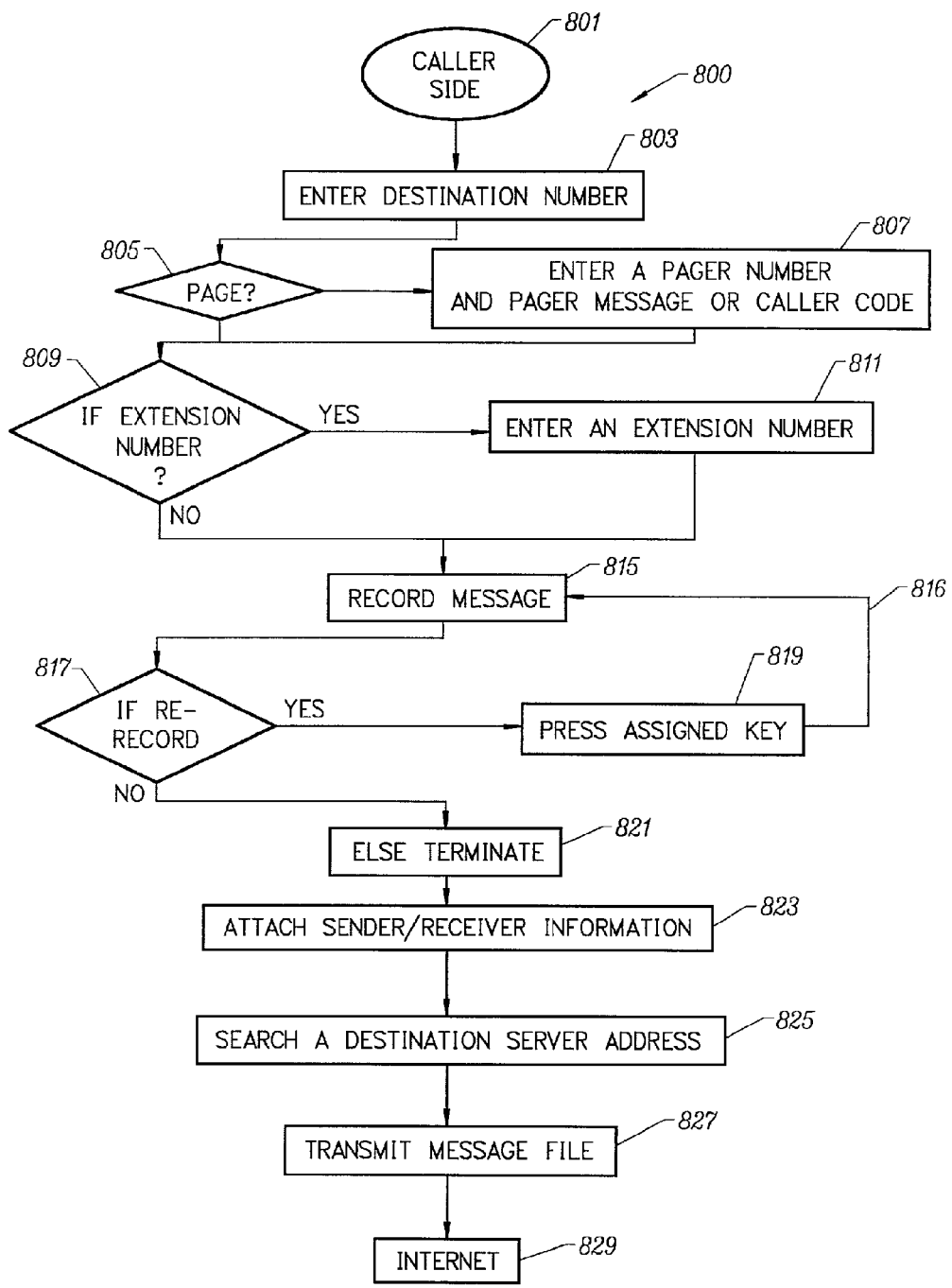
FIGS. 9-12 are simplified flow chart diagrams of system software according to embodiments of the present invention.

The simplified flow diagram 800 of FIG. 9 illustrates a process leaving a message with a receiver according to an embodiment of the present invention. The process generally involves steps of destination number entry 803, message recording 815, information attachment 823, searching destination server address 825, transmitting the message file 827 over the Internet 829, and others.

A destination telephone number from the caller side or caller (step 801) can be entered (step 803) using these following steps according to the present invention. If a pager for the receiver is used (step 805), the process allows the caller to enter a pager telephone number for the pager of the receiver through a telephone followed by a key assigned for allowing entry of the caller code for the pager (e.g., "*"), which allows the caller to enter a number (i.e., caller code) to be appeared on the pager display or screen. The caller than enters a destination telephone number (step 811) using the telephone keypad.

Alternatively, if a destination telephone number with an extension of the receiver (step 809) is used, the process allows the caller to enter the destination number with the extension (step 811) for the receiver through the telephone keypad. In particular, the caller enters the destination number into the access computer via telephone followed by a key (e.g., '') on the telephone assigned for prompting entry of the extension number, which allows the caller to enter the extension number into the access computer. Alternatively, the caller merely enters the destination telephone number (step 813**) for the receiver on the telephone keypad.

After entering the destination telephone number (and pager number in some embodiments), the process allows the caller to record a voice message (step 815) to be sent to a voice mailbox in memory of the access computer or other location. Alternatively, the process allows the caller to record a message which will be sent via facsimile to the receiver. Details of recording the voice message are described throughout the specification.

If the caller wants to re-record (step 817) the message, a key (e.g., "1") assigned to this function is depressed (step 819) on the telephone, which allows the caller to re-record the message (step 815) via branch 816. Alternatively, the caller presses a key assigned for termination (step 821) of the voice message. Upon terminating the voice message, the phone is placed back on the hook, which also can terminate the message in this process.

Once the voice message (or facsimile message) and destination (and pager number in some embodiments) are placed into memory of the access computer. The process attaches (step 823) sender/receiver information (e.g., e-mail address, phone number) to the message file. It searches (step 825) a destination server address, which is closest to the destination number. Preferably, the destination server address is in the same calling code (or area code) as the destination number to reduce any costs associated with conventional long distance calling, which is a benefit of the present invention. This occurs by matching the destination address to the destination server address in a look-up table or the like. Details of this procedure were previously described.

The message file with sender/receiver information (step 827) is transmitted to the destination server (or access computer) for storage (or retrieval) purposes. Any of the above embodiments and others can be used for preparing the sender/receiver information and message file and transmitting them over the Internet (step 829) to a destination access computer. The destination access computer can dial the destination telephone number and forward the voice message to a voice mail box, facsimile machine, or the like.

The above descriptions of the caller side process are merely examples of functions performed by computer software and the like. As is know to one of ordinary skill in the art, the above functions could be combined or even separated using either or both hardware and software or the like.

Figure 10:
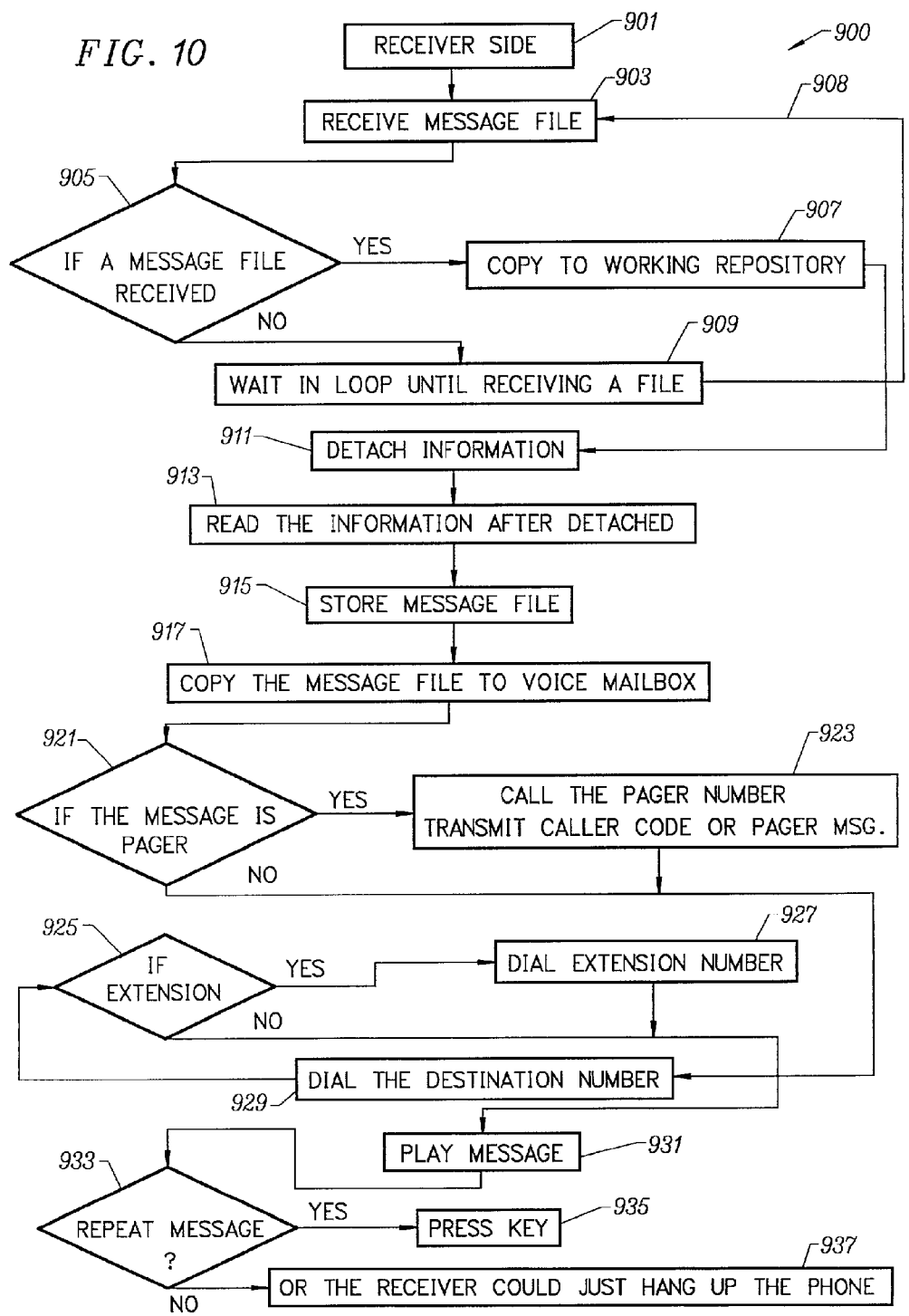

FIG. 10 is a simplified flow diagram of a process 900 performed on the receiver side (step 901) according to the present invention. The process begins by performing steps for receiving a message file (step 903), which includes at least the voice message, the destination number, and in some embodiments the pager number and caller code. If the message file is received from the Internet (step 905), a copy of the message file is placed into a working repository (step 907). Alternatively, the process waits in a loop (step 909) to receiver the message file via branch 908.

Upon receiving the message file, which is kept in a working repository, the process detaches (step 911) the voice message from the sender/receiver information. The sender/receiver information is read by the process (step 913). This reading step allows the process to designate the destination number and paging instructions, if any. The process stores (step 915) the message file into a memory of the access computer. In an embodiment, the process copies (step 917) the message file to a voice mailbox in the access computer or system from the working repository.

The process via read destination number step dials the destination number (step 919). Depending upon the type of delivery designated, the process performs the following steps. If the sender/receiver information designates a pager number (step 921) for the receiver, the process via access computer dials and calls (step 923) the pager number and, after the appropriate prompt, enters the number to be appeared on the pager display, as often necessary by the paging system. The process then dials the destination number (step 929) to connect the access computer to the device (e.g., voice mailbox, facsimile, etc.) at the destination number to deliver the message.

Alternatively, if the voice message is to be delivered at the receiver's destination phone number extension (step 925), the process via access computer dials (step 927) the destination number and, after receiving the appropriate prompts after a successful connection, enters the extension number of the receiver. Alternatively, the process via access computer merely dials the destination number (step 929) before proceeding to the remaining steps. These remaining steps can include transferring the voice message to a voice mailbox, a facsimile machine, or the like, such as those shown in the embodiments herein.

Upon successful connection, the access computer plays (step 931) the voice message. The voice message can be played directly to the receiver, to a voice mailbox, or to a facsimile machine. If the message is needed to be repeated by the receiver (step 933), the receiver presses (step 935) a key assigned (e.g., "1") for such a repeat operation or the receiver hangs up (step 937) the phone to terminate the operation.

The above descriptions of a receiver side process are merely examples of functions performed by computer software and the like. As is know to one of ordinary skill in the art, the above functions could be combined or separated using either or both hardware and software or the like.

Figure 11:
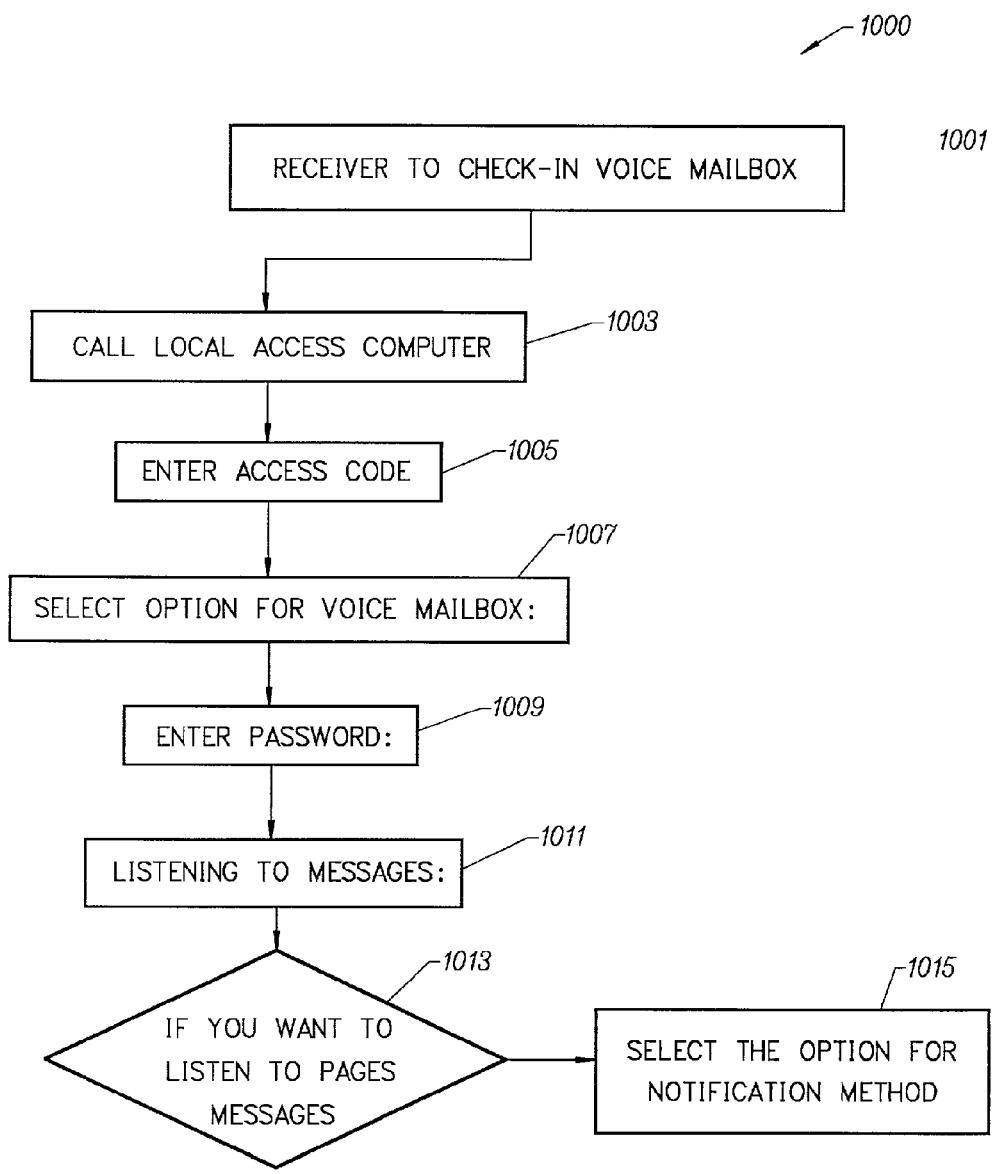

FIG. 11 is a simplified flow diagram 1000 illustrating a process for users (or receivers) of the present system to retrieve messages from an access computer, rather than a personal facsimile machine or voice mailbox. The process begins at step 1001. The user dials a telephone to call (step 1003) the local access computer. Upon connection and receiving a selected prompt asking the user for an access code, the user enters the access code (step 1005) through the keys of the telephone, which is received by the process. The user is now logged on.

The process prompts to the user a variety of options that could be performed by the present system. In an embodiment, the user selects a voice mailbox (step 1007), which can be password protected (step 1009) for the user. In these embodiments, the user enters a password. The process checks the password for verification or validation. Once verification or validation is made, the user selects a prompt for listening (step 1011) to voice messages, if they have been left.

Depending upon the type of delivery attached to the message, the user can select any one of a variety of messages. For instance, the user can select messages left using solely the destination number. Alternatively, messages prompted by a pager (step 1013) can be selected. Of course, the type of message selected depends upon whether any one is available.

The process for retrieving messages in the preceding description is merely an example of numerous functions performed by computer software and the like. As is know to one of ordinary skill in the art, the above functions could be combined or separated using either or both hardware and software or the like.

Figure 12:
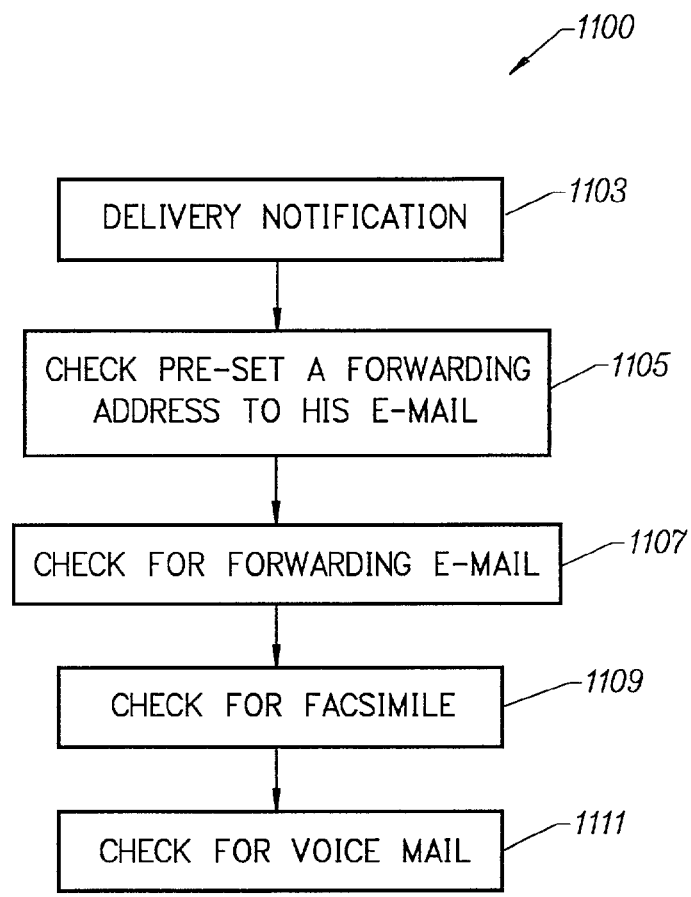

FIG. 12 is a simplified flow diagram 1100 of a process for delivery notification to a receiver. The process begins at step 1103. When a message file is transmitted to the receiver side of the access computer, the receiver can check for notification of messages from a caller using a variety of techniques. These techniques include notification by way of e-mail, facsimile, or phone mail. If the receiver would like notification from a personal e-mail box (step 1105), the caller must specify or set the e-mail notification to the voice message on the present system. The caller can also specify a notification to the receiver's facsimile, voice mailbox, or the like.

Alternatively, the receiver can ask for notification by forwarding all messages from callers to an e-mail box (step 1107) or a voice mailbox (step 1113) or facsimile machine (step 1111). The receiver can also change the designation of the notification by simply calling the access computer and providing the designation.

In other embodiments, the process notifies to the receiver the arrival of e-mail messages to a receiver by way of transmitting the notification to the receiver's voice mailbox, facsimile machine, or e-mail box. Voice messages can also be transmitted to an e-mail box or voice mailbox or facsimile machine using the appropriate conversions. Of course, the type of delivery notification will depend upon the application.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For instance, each access computer may actually comprise two separate computers, one for incoming messages and the other for outgoing messages. In such a case each individual computer need only be configured for its specific function.

The invention claimed is:

1. A method for receiving and forwarding voice messages comprising:

receiving a voice message from a first access device over a first network by an intermediary access computer, wherein said voice message is stored by said first access device, said voice message comprising voice data and destination information;

storing said voice message by said intermediary access computer;

retrieving destination information from said voice message by said intermediary access computer;

selecting a second access device based on said destination information;

transmitting said voice message from said intermediary access computer to said second access device over a second network, wherein said voice message is stored by said second access device.

2. A system for receiving and forwarding voice messages comprising:
   means for receiving a voice message from a first access device over a first network by an intermediary access computer, wherein said voice message is stored by said first access device, said voice message comprising voice data and destination information;
   means for storing said voice message by said intermediary access computer;
   means for retrieving destination information from said voice message by said intermediary access computer;
   means for selecting a second access device based on said destination information;
   means for transmitting said voice message from said intermediary access computer to said second access device over a second network, wherein said voice message is stored by said second access device.

3. The method of claim 1 wherein said first network and said second network are the Internet and said steps of receiving and transmitting utilize a TCP/IP-based communication protocol.

4. The method of claim 1 further comprising the step of:
   recording said voice data by said first access device by storing a voice signal received from a telephone device coupled to said first access device through a communication medium.

5. The method of claim 1 further comprising the step of:
   playing back said voice data by said second access device by sending a voice signal to a telephone device coupled to said second access device through a communication medium.

6. The method of claim 1 wherein said destination information comprises a telephone number associated with a recipient of said voice message.

7. The system of claim 2 wherein said first network and said second network are the Internet.

8. The system of claim 2 further comprising:
   means for recording said voice data by said first access device by storing a voice signal received from a telephone device coupled to said first access device through a communication medium.

9. The system of claim 2 further comprising:
   means for playing back said voice data by said second access device by sending a voice signal to a telephone device coupled to said second access device through a communication medium.

10. The system of claim 2 wherein said destination information comprises a telephone number associated with a recipient of said voice message.

11. An intermediary access computer configured to receive and forward voice messages comprising:
    an input interface coupled to a first network, wherein said first network is coupled to a first access device storing a voice message;
    an output interface coupled to a second network, wherein said second network is coupled to a second access device;
    a storage device;
    a processing element; and
    a memory element containing instructions for said processing element wherein said instructions configure said intermediary access computer to perform the steps of:
        receiving said voice message from said first access device over said first network through said input interface, said voice message comprising voice data and destination information;
        storing said voice message within said storage device;
        retrieving destination information from said voice message;
        selecting a second access device based on said destination information;
        transmitting said voice message through said output interface to said second access device over said second network, wherein said voice message is stored by said second access device.

12. The intermediary access device of claim 11 wherein said first network and said second network are the Internet and said steps of receiving and transmitting utilize a TCP/IP-based communication protocol.

13. The intermediary access computer of claim 11 wherein said destination information comprises a telephone number associated with a recipient of said voice message.

* * * * *